March 25, 1969     T. J. JOHNSTON     3,434,824
REDUCTION OF ALUMINUM OXIDE BY ELEMENTAL SILICON
Filed Sept. 16, 1966

INVENTOR
THOMAS JOSEPH JOHNSTON

BY *Glenn, Palmer, Matthews & Lyne*
ATTORNEYS.

March 25, 1969     T. J. JOHNSTON     3,434,824
REDUCTION OF ALUMINUM OXIDE BY ELEMENTAL SILICON
Filed Sept. 16, 1966

United States Patent Office 3,434,824
Patented Mar. 25, 1969

3,434,824
REDUCTION OF ALUMINUM OXIDE BY ELEMENTAL SILICON
Thomas Joseph Johnston, Muscle Shoals, Ala., assignor to Reynolds Metals Company, Richmond, Va., a corporation of Delaware
Filed Sept. 16, 1966, Ser. No. 579,871
Int. Cl. C22b 21/02
U.S. Cl. 75—68                            8 Claims This invention relates to a novel method for the production of aluminum, or of an aluminum-silicon alloy by thermal reduction of an aluminous ore. More particularly, the invention concerns the thermal reduction of alumina or bauxite by means of elemental silicon.

It was long believed by those skilled in the art that, although silicon resembled carbon in its great affinity for oxygen, and acted similarly as a powerful reducing agent in many reactions, the reduction of alumina by silicon would not take place. Thus, L. Kahlenberg and W. J. Trautman, in an article entitled "Reduction by Means of Silicon," in Trans. Amer. Electrochem. Soc., 39, 377–416 (1921) attempted to reduce alumina by means of silicon by three routes. The finely pulverized alumina was mixed with powdered silicon and heated in a test tube in a Bunsen flame. Second, the mixture of $Al_2O_3$ and Si was placed in a Hessian crucible and the reaction was attempted to be started with an ignition cherry (made by mixing potassium chlorate and magnesium powder with a little gelatin as binder and molding into a small ball having a magnesium ribbon as a fuse). Third, the alumina was heated in an electric arc between two silicon electrodes. In each instance, the authors reported that alumina was not reduced by silicon.

In accordance with the present invention, it was found, surprisingly and unexpectedly, that alumina, or aluminous ores containing alumina, such as bauxite, may be successfully reduced by means of elemental silicon at elevated temperatures, above about 1850° C. The reduction reaction is expressed by the following equation:

$$Al_2O_3 + 3Si \rightarrow 2Al + 3SiO \qquad (1)$$

When alumina, and silicon in excess of the stoichiometric amount, are heated together the reaction begins at about 1800° C. and has been observed to occur as high as 2000° C. The preferred range of temperature is between about 1900° and 1950° C. At these temperatures, the silicon (melting point 1420° C.) is of course in its molten condition, but surprisingly the alumina (melting point about 2020° C.) appears also to be in molten condition, thus the reaction appears to take place substantially between liquid phases, instead of between liquid silicon and solid alumina phases as would ordinarily be expected. It is believed that this unexpected presence of both reactants in liquid phase facilitates the reaction between molten silicon and aluminum oxide. As the reaction proceeds the vapor product, silicon monoxide, is volatilized from the reaction zone and is readily recovered by condensation.

The aluminum metal which is liberated tends to dissolve in excess unreacted silicon metal to form alloys of aluminum and silicon of variable composition. The Al-Si alloy coalesces well, however, and is easily separated from remaining slag. It was found that the foregoing reaction proceeds vigorously and at rates which are industrially practicable. The reaction is believed to take place according to the following intermediate stages:

$$Al_2O_3 + Si \rightarrow Al_2O_2 + SiO \qquad (2)$$
$$Al_2O_2 + Si \rightarrow Al_2O + SiO \qquad (3)$$
$$Al_2O + Si \rightarrow 2Al - SiO \qquad (4)$$

However, in view of the great difficulties of determining intermediate reaction steps between reactants and the final product, I do not wish to be bound by any particular array of intermediate reaction steps. The oxidation of the silicon to volatile SiO in the process of the invention removes from the reaction zone oxidized silicon compounds, the presence of which would hinder the desirable reaction in accordance with the well known laws of mass action, and also avoids the serious disadvantage which usually attends the use of silicon as a reducing agent, which is the formation of non-volatile silicon dioxide, $SiO_2$, which might contaminate the reduced metal as inclusions, and add to the amount of slag formed. Indeed, I have found that under the conditions of the invention $SiO_2$ itself is unstable in the presence of silicon and hence the alumina used in the process of this invention need not be free of silica or silicates.

The aluminum-silicon alloys formed in the reaction of the invention generally contain upwards of 10% aluminum. They are advantageously removed from the reaction zone to a separate vessel for separation of silicon by any suitable method, such as cooling followed by centrifugation. Thus, for example, the molten alloy of aluminum and silicon may be allowed to cool to form a crystalline mass of non-eutectic material, from which a residual liquid phase such as a eutectic may be separated by centrifugation. Processes of this type are well known and do not form a part of the present invention.

In relation to the over-all process, the silicon serves both as a reducing agent and as a solvent for the liberated aluminum. Upon separation, the silicon can be recovered and recycled to the reduction step.

Other methods of separating and recovering silicon from the molten aluminum-silicon alloy include controlled cooling to crystallization. Another method of silicon recovery which can be employed is to raise the temperature of the alloy while adding silicon dioxide, so that the silicon will react preferentially with the silicon dioxide to form silicon monoxide which can be vaporized, condensed and recovered, in accordance with the equation:

$$Si + SiO_2 \rightarrow 2SiO \qquad (5)$$

The condensed silicon monoxide can be converted readily to elemental silicon for recycling to the reduction step either by reduction with carbon in accordance with the equation:

$$SiO + C \rightarrow Si + CO \qquad (6)$$

or by hydrolysis with water or steam under pressure, as shown in the equation:

$$SiO + HOH \xrightarrow{500°\ C.} SiO_2 + H_2 \qquad (7)$$

The recovered silicon dioxide is utilized as a source of elemental silicon by reduction with carbon:

$$SiO_2 + 2C \rightarrow Si + 2CO \qquad (8)$$

while the hydrogen is used as an energy source.

For a better understanding of the invention, reference is made to the accompanying drawings, which show present preferred embodiments of the apparatus in schematic form.

Figure 1:
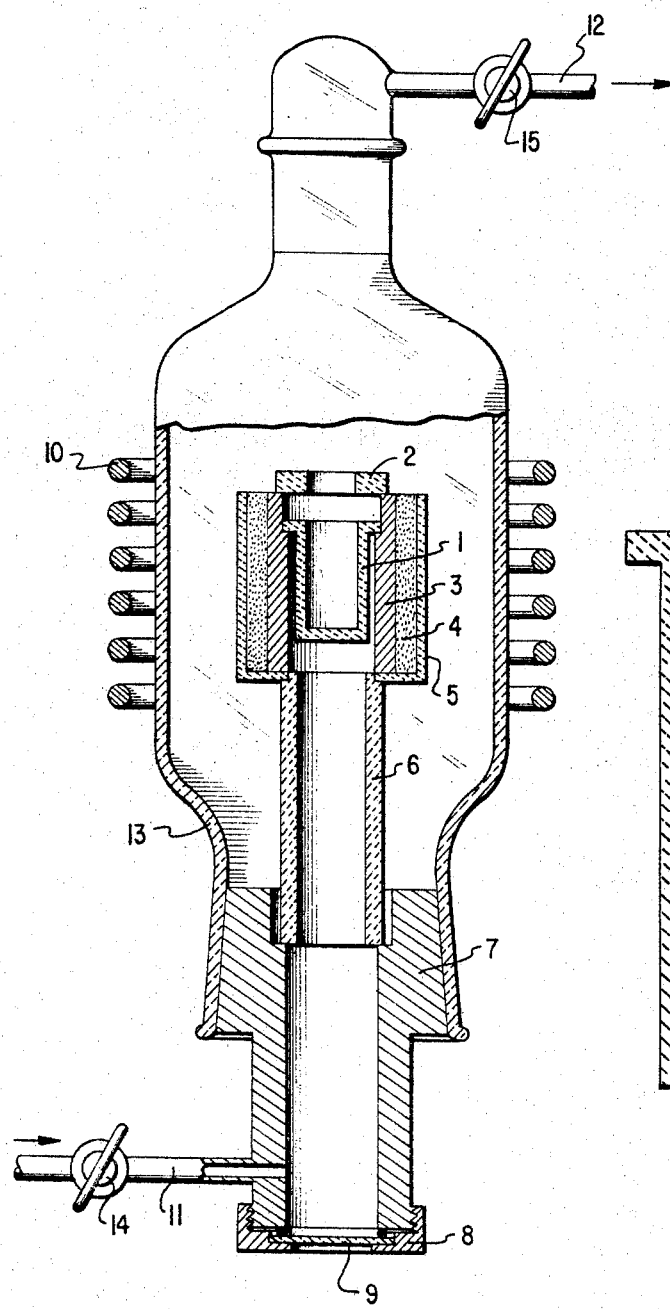
FIGURE 1 shows, partly in cross section, an arrangement of apparatus for performing the reduction of aluminum oxide by elemental silicon.

Referring to FIGURE 1, the apparatus as shown is adapted to perform the reduction according to a batch process, and comprises a crucible 1 made of a refractory material such as, for example, boron nitride, which is fitted into a graphite susceptor 3. The susceptor 3 is fitted into a refractory container 5 which may also be made of boron nitride, the space between the susceptor 3 and the container 5 being filled with suitable insulating material, such as carbon flour. The susceptor 3 is covered at its upper end by a refractory radiation shield 2 which is also preferably made of boron nitride. The foregoing crucible assembly is supported on a refractory tube 6, also made of boron nitride, which in turn rests in an annular groove in a metal support 7 which is stoppered into a glass vessel 13 which surrounds the assembly. Vessel 13 is fitted at its lower end with a sight glass 9 which is held in place against the lower end of metal support 7 by threaded packing nut 8 which engages an opposing thread at the lower exterior of metal support 7. Vessel 13 is also provided with inlet 11 regulated by valve 14 and exit tube 12 regulated by valve 15. The inlet and exit means can be employed to purge the vessel 13 and its contents with an inert gas such as argon. Vessel 13 is further provided with external heating means comprising a high frequency induction coil 10, supplied with power from a high frequency converter (not shown).

The operation of the apparatus of FIGURE 1 is as follows:

A suitable amount of a mixture of powdered alumina and powdered silicon is placed in crucible 1, and the unit is purged by passing a flow of argon gas through inlet 11 and outlet 12, after which the induction coil 10 is energized. The induction field from coil 10 serves to raise the temperature of graphite susceptor 3, thereby heating the enclosed crucible 1 and its contents. The temperature at the bottom of crucible 1 is observed with an optical pyrometer through sight glass 9. After the temperature of crucible 1 has been raised to about 1800°–2000° C., and maintained for a suitable length of time to permit the reaction to take place, the power to the induction coil 10 is cut off and the unit is allowed to cool rapidly to room temperature, after which crucible 1 and its contents are removed.

Figure 2:
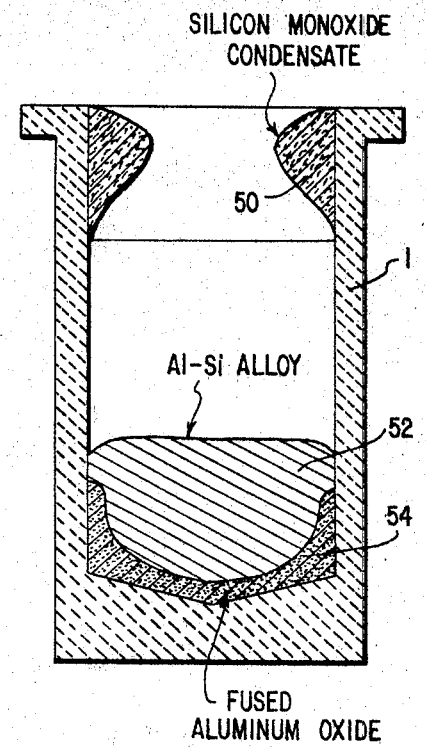
FIGURE 2 is a cross section of the crucible of FIGURE 1 showing the distribution of the contents after completion of the reduction.

FIGURE 2 shows schematically the distribution of the contents of crucible 1 after cooling and removing from the assembly of FIGURE 1. Near the top of the crucible is a ring 50 of deposited solid silicon monoxide SiO, which has presumably distilled from the reaction mass and condensed from the vapor at the somewhat cooler upper portion of the crucible. Substantially below ring 50 and generally not in contact with the silicon monoxide ring is a metallic button 52 of aluminum-silicon alloy resting upon, and partly contained within, a layer 54 of alumina which has the appearance of having solidified from the molten condition. The appearance of layers 52 and 54 after solidification indicates that during the high temperature reaction they had existed as substantially immiscible molten liquids with the alumina-rich liquid underlying the aluminum-silicon metallic phase.

Figure 3:
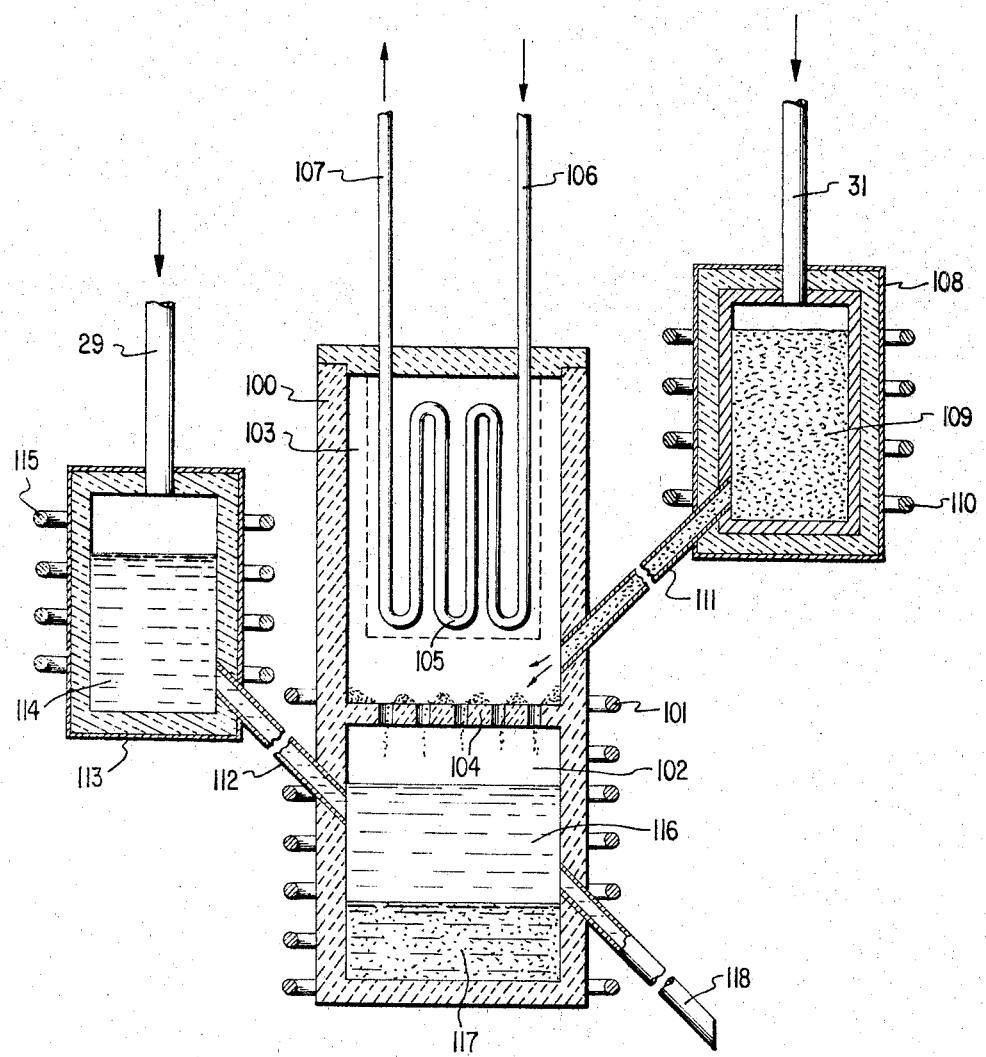
FIGURE 3 shows a form of apparatus for carrying out the reduction in a continuous process.

FIGURE 3 illustrates a form of apparatus which may be employed in carrying out the reduction of alumina by elemental silicon with simultaneous production of silicon monoxide in a substantially continuous manner.

The apparatus comprises a reaction vessel 100 made of a suitable refractory material and provided with heating means 101 such as a high frequency induction coil. The vessel 100 comprises a lower reaction section 102 and an upper condensation section 103, separated by a suitable radiation shield 104, containing passages to permit vapors of silicon monoxide to pass upward from the lower reaction zone 102 to the upper condensation zone 103. In the upper condensation zone the vapors condense on removable cooled hollow members 105, such as for example, a pipe coil, cooled internally by a forced draft of air entering at inlet 106 and leaving at outlet 107.

The apparatus further includes a supply vessel 108 which contains a supply 109 of alumina, the supply vessel being provided with heating coils 110 for drying and preheating the alumina. The alumina is introduced into reaction vessel 100 via conduit 111.

The reaction vessel is also provided with means for supplying molten silicon via conduit 112, said means comprising a vessel 113 adapted to hold a body of molten silicon 114, which is kept molten by heating means 115.

In the operation of the apparatus of FIGURE 3, there is maintained in the lower reaction zone 102 a layer 116 of molten alumina-silicon alloy above an underlying layer 117 of molten alumina-rich phase. Said aluminum-silicon layer 116 is substantially continuously fed with molten silicon from supply vessel 113 via conduit 112, and at the same time is fed via conduit 111 with suitably preheated alumina powder, in proportions such as to maintain a relatively constant amount of the alumina-rich phase 117. The aluminum-silicon alloy 116 is withdrawn periodically through tap hole 118 and recovered. It will be understood that while FIGURE 3 illustrates a preferred embodiment, it will be apparent to those skilled in the art that variations may be made in regard to specific operating details.

The alumina metal and the aluminum-silicon alloys produced by the process of the present invention are useful for the production of fabricated and semi-fabricated forgings, castings, and wrought aluminum articles.

The following examples illustrate the practice of the invention, but are not to be considered as limiting.

Example 1

8 grams of a mixture consisting of 102 parts by weight of Bayer process alumina and 84 parts by weight of pulverized silicon comprising 0.25 weight percent calcium, 2.1 weight percent iron, 0.7 weight percent aluminum, balance silicon was placed in the boron nitride crucible of FIGURE 1 and the apparatus was assembled. A purge of argon gas was passed through the equipment for about 10 minutes, the high frequency converter was turned on and the reaction zone was heated to about 1950° C. over a period of about 3–4 minutes. The crucible and its contents were then held at 1950° C. for about 15 minutes, the high frequency converter was turned off and the apparatus was allowed to cool to room temperature. Upon removing the boron nitride crucible it was found that the various reaction products were distributed in the crucible substantially as shown in FIGURE 2. A chemical analysis of material from the aluminum-silicon layer showed 21.19% aluminum, 76.95% silicon and 1.86% iron.

Example 2

8.6 grams of the alumina-silicon mixture of Example 1 was placed in the boron nitride crucible and the procedure of Example 1 was followed. During the period of rapid temperature increase visible signs of the occurrence of the reaction were noted as the temperature of the bottom of the crucible passed through 1850° C. Heating was continued to a temperature of 1900° C. and was maintained at about 1900° C. for approximately 3–5 minutes. The resulting aluminum-silicon alloy contained 12.61% aluminum, 85.44% silicon, and 1.95% iron. The crucible contents comprised a button of aluminum-silicon alloy substantially floating within a grayish colored nonmetallic material which appeared to have been fused before solidification. X-ray diffraction analysis of this gray non-metallic material from several of the runs showed the presence of alpha alumina crystals and some silicon. In general appearance, however, the sample was substantially free of voids, had an amorphous texture and a slightly glassy appearance indicative of a previous molten condition. No crystalline alumina inclusions were detected by X-ray analysis of the aluminum-silicon metallic button.

Example 3

6.3 grams of a mixture consisting of one part by weight of silicon and one part by weight of calcined Georgia clay containing the equivalent of 45% alumina, 49% silica, 2% $TiO_2$, aind assorted minor impurities, was placed in the crucible and maintained for about 8 minutes at temperatures between about 1765 and 1868° C. The resulting metallic button comprised 7.6% aluminum by weight.

What is claimed is:

1. Method for the reduction of an oxide of aluminum to metallic aluminum which comprises providing a reaction mixture consisting essentially of elemental silicon and aluminous ore providing said oxide, heating said reaction mixture at a temperature above about 1850° C. to form aluminum and silicon monoxide, and recovering the aluminum.

2. The method of claim 1 in which the aluminous ore is alumina.

3. The method of claim 1 in which the aluminous ore is bauxite.

4. The method of claim 1 in which the reaction temperature is between about 1900° C. and about 1950° C.

5. The method of claim 1 in which the aluminum is recovered in the form of an alloy of aluminum and silicon.

6. The method of claim 1 in which the silicon monoxide formed is converted to elemental silicon which is recycled to the heating step.

7. The method of claim 1 in which the elemental silicon is in the molten state.

8. The method of claim 1 in which the elemental silicon is in the form of a molten bath of aluminum-silicon alloy into which the aluminum oxide is introduced.

References Cited

UNITED STATES PATENTS

| | | | |
|---|---|---|---|
| 677,207 | 6/1901 | Hall | 75—68 X |
| 688,510 | 12/1901 | Greene et al. | 75—68 X |
| 2,054,427 | 9/1936 | Kirsebom | 75—27 |
| 2,242,497 | 5/1941 | Zintl | 23—142 X |
| 2,702,750 | 2/1955 | George | 75—27 X |
| 3,254,988 | 6/1966 | Schmidt et al. | 75—68 |

OTHER REFERENCES

Journal of American Ceramic Society: vol. 27, No. 10, 1944, p. 295.

Kahlenberg et al.: Reduction by Means of Silicon; paper presented to American Electrochemical Society; Atlantic City, N.J., Apr. 23, 1921; 75–27.

L. DEWAYNE RUTLEDGE, *Primary Examiner.*

H. W. TARRING, *Assistant Examiner.*

U.S. Cl. X.R.

75—27